United States Patent [19]

Hahn et al.

[11] Patent Number: 5,622,746
[45] Date of Patent: Apr. 22, 1997

[54] TANTALUM CAPACITOR IMPREGNATION PROCESS

[75] Inventors: Randolph S. Hahn; Brian J. Melody, both of Greenville; John D. Henley, Jr.; John Piper, both of Simpsonville; Shelby J. Poore, Honea Path; Tsung-Yuan Su, Greer; John T. Kinard, Simpsonville, all of S.C.

[73] Assignee: Kemet Electronics Corporation, Greenville, S.C.

[21] Appl. No.: 399,981

[22] Filed: Mar. 7, 1995

[51] Int. Cl.$^6$ .............................. B05D 5/12; H01G 7/00
[52] U.S. Cl. ..................... 427/79; 427/80; 427/81; 29/25.03; 29/25.42; 361/529
[58] Field of Search ..................... 427/79, 80, 81; 29/25.03, 25.42; 361/529

[56] References Cited

U.S. PATENT DOCUMENTS

| | | | |
|---|---|---|---|
| 3,217,381 | 11/1965 | Wessling | 29/25.31 |
| 3,301,704 | 1/1967 | Zind | 29/25.03 |
| 3,302,074 | 1/1967 | Black | 29/25.03 |
| 3,337,429 | 8/1967 | Zind | 204/38 |
| 3,397,446 | 8/1968 | Sharp | 29/25.03 |
| 3,458,775 | 7/1969 | Flaks et al. | 361/433 |
| 3,502,949 | 3/1970 | Seiki | 29/25.03 |
| 4,038,159 | 7/1977 | Nishino et al. | 204/38 A |
| 4,042,420 | 8/1977 | Nishino et al. | 148/6 |
| 4,105,513 | 8/1978 | Nishino et al. | 204/38 A |
| 4,148,131 | 4/1979 | Nishino et al. | 29/570 |
| 4,164,455 | 8/1979 | Aronson et al. | 204/38 A |
| 4,269,691 | 5/1981 | Deborski | 428/126.3 X |
| 4,302,301 | 11/1981 | Tierman | 204/38 A |
| 4,652,463 | 3/1987 | Peters | 427/53.1 |
| 4,984,342 | 1/1991 | Auer et al. | 29/25.03 |
| 5,120,423 | 6/1992 | Kurita et al. | 205/200 |
| 5,184,286 | 2/1993 | Lauf et al. | 361/529 |
| 5,227,016 | 7/1993 | Carlson et al. | 156/665 |

FOREIGN PATENT DOCUMENTS

| | | |
|---|---|---|
| 0416993 | 3/1991 | European Pat. Off. . |
| 117555 | 1/1976 | German Dem. Rep. . |
| 2256739 | 6/1974 | Germany . |
| 49023195 | 2/1974 | Japan . |
| 60-086029 | 5/1985 | Japan . |
| 86029 | 5/1985 | Japan . |
| 106871 | 7/1993 | Romania . |
| 1120130 | 7/1968 | United Kingdom . |
| 1182506 | 2/1970 | United Kingdom . |

OTHER PUBLICATIONS

The Condensed Chemical Dictionary, pp. 545, 729 and 769.
Klose, "Electrical Properties of Manganese Dioxide and Manganese Sesquioxide," *J. Electrochem. Soc.: Electrochemical Science,* 117(7):854–858.
Nishino et al., "Manganese Dioxide Symposium", 1980, Tokyo (published by Electrochemical Society, 1981), pp. 305–320.

*Primary Examiner*—Shrive Beck
*Assistant Examiner*—Brian K. Talbot
*Attorney, Agent, or Firm*—Banner & Witcoff, Ltd.

[57] ABSTRACT

The present invention provides a manganese nitrate coating having high conductivity and solid tantalum anode capacitors having low ESR by using an oven atmosphere which effectively treats all of the anodes in the oven. The manganese nitrate coating of the present invention is produced under highly oxidizing conditions by providing one or more oxidizing agents more active than nitrogen dioxide in the atmosphere of the oven during pyrolysis of manganese nitrate. The oxidizing agents include nitric acid, hydrogen peroxide, ozone, and mixtures thereof.

19 Claims, 6 Drawing Sheets

TANTALUM CAPACITOR IMPREGNATION PROCESS

This invention relates to a manganese nitrate pyrolysis process using atmospheric doping to produce dense, conductive manganese dioxide ($MnO_2$) coatings on tantalum capacitor anodes. The process uses pyrolysis atmosphere doping with one or more non-halogenated substances which are more highly oxidizing than nitrogen dioxide ($NO_2$), such as nitric acid, hydrogen peroxide, ozone, and mixtures thereof.

BACKGROUND OF THE INVENTION

Since the advent of the tantrum capacitor in the early 1950's, much effort has been expended to develop an effective process to coat solid tantalum capacitor anodes with electrically conductive manganese dioxide. The "solid" tantalum capacitor anodes are porous and are typically prepared using powder metallurgy techniques, e.g. sintering, and then anodization. These porous anodes are then coated, both internally (within the pores) and externally, with electrically conductive manganese dioxide. The manganese dioxide coating acts as the cathode or negative capacitor plate and facilitates the flaw healing or isolation process characteristic of solid tantalum electrolytic capacitors via thermal reduction of the manganese dioxide in contact with flaw sites to a lower, less electrically conductive oxide.

The manganese dioxide coating is typically formed by dipping the anodized tantalum anodes in an aqueous manganese nitrate solution and then placing the manganese nitrate impregnated anodes in an oven at a temperature usually between 200° C. and 400° C. for a sufficient time to pyrolyze the manganese nitrate to manganese dioxide. In actual practice, multiple impregnation and pyrolysis cycles are usually employed, as are various concentrations of the manganese nitrate solution.

Dense, physically strong and highly electrically conductive manganese dioxide coatings are associated with superior device performance, particularly with low device ESR (equivalent series resistance). In attempts to obtain these desirable properties, capacitor manufacturers have varied the number of impregnation pyrolysis cycles, the manganese nitrate concentration, the oven temperature, and the composition of the oven atmosphere. However, none of these methods have been completely successful in obtaining a manganese dioxide coating of superior performance, particularly when producing tantalum capacitors on a large scale.

It was also discovered that the introduction of steam results in the production of more physically dense and electrically conductive manganese dioxide coatings than coatings produced in the absence of added steam. U.S. Pat. No. 3,337,429, for instance, describes injecting steam into the oven. The steam provides water vapor in addition to any water vapor produced by evaporation of the water component of the manganese nitrate solution.

Processes for providing uniform pyrolytic coatings of manganese dioxide on tantalum anodes have proven to be complex and do not always produce the desired results (i.e. dense, conductive coatings). Furthermore, processes which proved effective on a laboratory scale have been very difficult to scale-up to production scale. For example, it has proven difficult to adapt to variations in anode size or oven loading—that is the number of devices pyrolyzed at one time.

Peter H. Klose of Kemet Electronics provided one of the first detailed studies of the pyrolysis of manganese nitrate solutions and the manganese dioxide produced in the reaction. His findings, published in the *Journal of The Electrochemical Society*, Vol. 117, No. 7, July 1970, Pages 854–858, describe the variable specific gravity (from 2.5 to 4.7 $gm/cm^3$) and electrical resistivity (from 0.1 to 0.0028 Ohm.cm) of manganese dioxide produced by pyrolysis of manganese nitrate under a variety of conditions. The most important finding appears to be that the highest density, most electrically conductive manganese dioxide is produced under conditions wherein the decomposition gases are confined in close proximity to the pyrolyzing manganese nitrate, preferably under a very slight pressure above atmospheric.

Nishino et al., in U.S. Pat. Nos. 4,038,159 and 4,042,420, have expanded upon Klose's work by using small, positive pressure ovens to produce dense, highly conductive manganese dioxide coatings on tantalum capacitor anodes. According to Nishino et al. these ovens act to confine the decomposition gases (i.e. $H_2O$, $NO_2$, and $NH_3$ if ammonia is added to the manganese nitrate) to a relatively small volume of space surrounding the anodes and dense, smooth, uniform manganese dioxide layers are produced. See also "Electrical and Physical Properties of $MnO_2$ Layer for the High Performance Tantalum Solid Electrolytic Capacitor"(second Manganese Dioxide Symposium, Tokyo, 1980, Proceedings published 1981 by the Electrochemical Society)

Aronson et al., in U.S. Pat. No. 4,164,455, goes one step further by not only using a small volume pyrolysis oven, but also by injecting nitrogen dioxide ($NO_2$) as well as steam into the oven chamber. More specifically, at least 10% by volume of nitrogen dioxide mixed with steam and/or inert gas is injected into the pyrolysis oven at temperatures between 170° C. and 250°. Inert gases include air and nitrogen.

A method to treat manganese nitrate coatings in an oven to produce manganese dioxide coated tantalum anodes having low ESR values for all of the anodes in an oven is desirable.

It is an object of the present invention to provide a tantalum capacitor impregnation method which results in a manganese dioxide coating having a high conductivity.

It is a further object of the invention to provide a method of producing tantalum capacitors exhibiting low ESR.

It is a still further object of the invention to provide a method of producing tantalum capacitors in which all capacitors within an oven have low ESR values.

SUMMARY OF THE INVENTION

The present invention is directed to a method for forming a coating of manganese dioxide on tantalum capacitor anodes. A tantalum anode is impregnated with manganese nitrate and placed in an oven. The manganese dioxide coating of the present invention is produced under highly oxidizing conditions by providing one or more oxidizing agents more oxidizing than nitrogen dioxide in the atmosphere of the oven during pyrolysis of manganese nitrate. These oxidizing agents, such as nitric acid, hydrogen peroxide and ozone, produce high conductivity pyrolytic manganese dioxide coatings and solid tantalum capacitors exhibiting low ESR.

The present invention provides a tantalum capacitor impregnation method which results in manganese dioxide coatings which are dense, physically strong and highly electrically conductive. The method of the invention effectively treats all tantalum capacitors within an oven.

In accordance with one aspect of the invention, it has been discovered that the improvement (i.e., reduction) in device ESR is larger when the pyrolysis oven atmosphere contains a larger amount of oxidizing agent(s) more oxidizing than nitrogen dioxide up to the point where approximately ½ of the oven atmosphere comprises the oxidizing agent(s), with the non-oxidizing component comprising steam.

It is to be understood that both the foregoing general description and the following detailed description are exemplary and explanatory only and are not restrictive of the present invention as claimed.

DETAILED DESCRIPTION OF THE INVENTION

Figure 1:
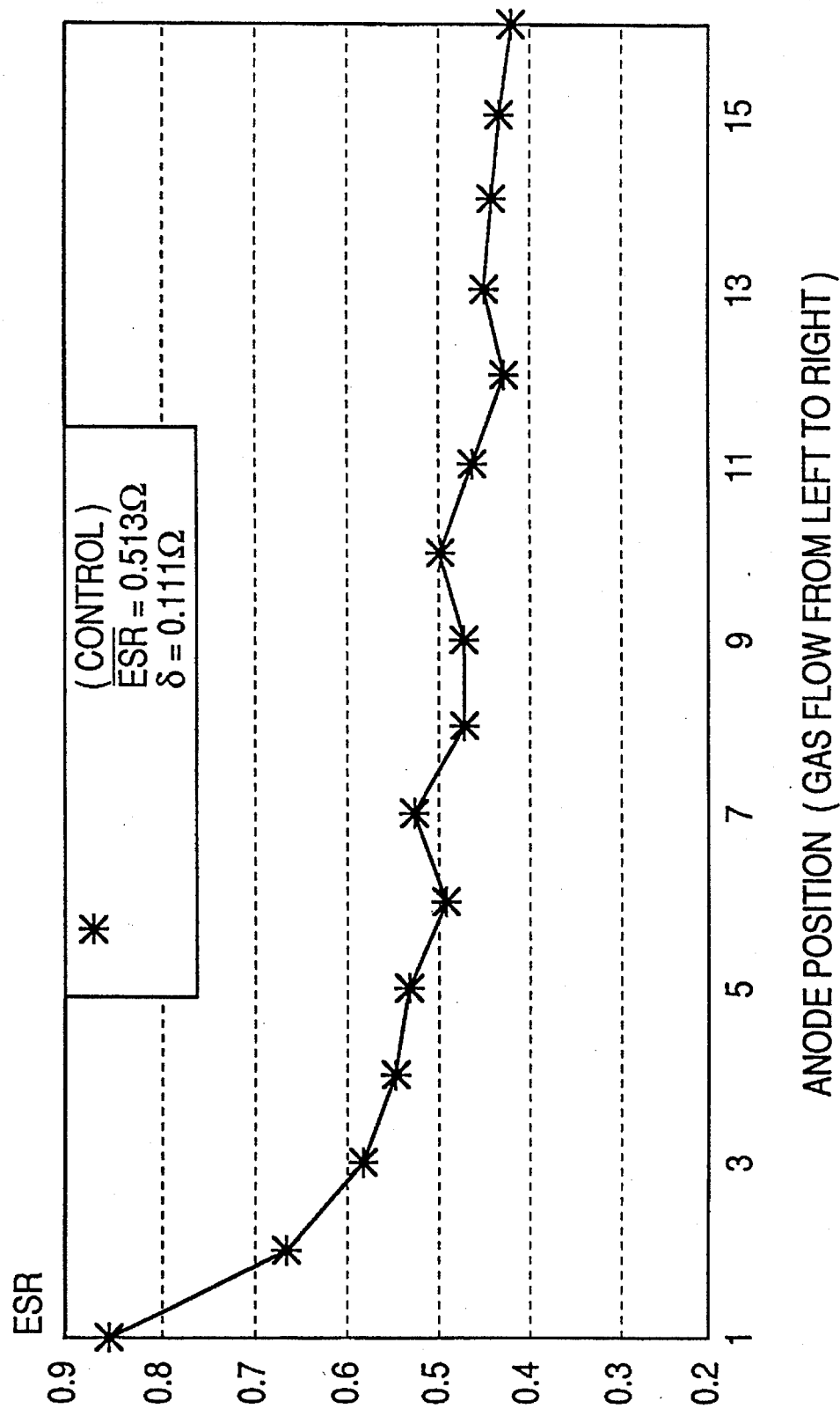
FIG. 1 illustrates an ESR profile in a lateral flow oven with no gas injection.

It was discovered that the presence of one or more oxidizing agents more oxidizing than nitrogen dioxide in the atmosphere of an oven during pyrolysis provided manganese nitrate coatings of high conductivity and solid tantalum capacitors having low ESR. Further, it was discovered the improvement in the ESR of solid tantalum capacitors is dependent upon the amount of oxidizing agent present and is more pronounced (even lower) at higher concentrations.

The present invention is directed to coating a sintered and anodized valve metal capacitor anode with manganese dioxide. The so-called "valve metals" are those metallic elements, their alloys, and metallic glass compositions (rapidly chilled alloys) which form adherent anodic oxide films useful as capacitor dielectrics. Examples of valve metals include tantalum, niobium, aluminum, titanium, and zirconium, with tantalum being found to give superior performance. For convenience, the invention will be described using a tantalum capacitor. However, using other valve metals, alloys, and metallic glass compositions is fully contemplated and within the scope of the present invention.

In accordance with the present invention, the sintered and anodized tantalum capacitor anode is dipped in a manganese nitrate solution, which solution impregnates and coats the anode, and then placed in an pyrolysis oven and heated. During the heating process, the oven is injected with steam and with an oxidizing agent which is more oxidizing than nitrogen dioxide. The coating of manganese nitrate is pyrolyzed to a coating of manganese dioxide.

The solid tantalum capacitor anode typically has a tantalum capacitor anode and a manganese dioxide coating which behaves as a cathode. The tantalum capacitor anode used in the present invention can be formed using conventional techniques. Typically the anode is in a pellet form of cylindrical or rectangular shape and has a solid tantalum wire attached or embedded therein. The pellet serves as the anode and the wire as the anode lead. The pellet is then sintered in a vacuum furnace at a temperature between about 1400°–2200° C. to give mechanical strength and to vaporize and remove any impurities. The sintered pellet is then anodized using well known techniques, for example in an acid bath to form an oxide ($Ta_2O_5$) film or layer which then acts as a dielectric film of the capacitor. The tantalum pellet is porous and the oxide film will coat all exposed surface areas of the pellet including the pores.

Aqueous manganese nitrate solutions useful for impregnation are well known in the art. A typical solution may contain from about 5 wt % to over 70 wt. % manganese nitrate based on the weight of the solution. The solution may also contain minor amounts (up to a few percent by weight) nitric acid, low molecular weight alcohols, surfactants, etc., for the purpose of enhancing solution stability, improving wetting of the anodes, enhancing the uniformity of the coating, etc., without departing from the scope of the present invention.

The anode is left in solution until the anode is impregnated with the solution, typically from several seconds to several minutes. The determination of the concentration of the solution and the amount of time for impregnation are well within the skill of the art. Generally, though not always, solutions containing a relatively small percentage of manganese nitrate are used for the early coatings, while solutions containing a relatively high concentration of manganese nitrate are employed for the later coatings. A suspension of manganese dioxide powder in a manganese nitrate solution (a so-called "slurry" coating) may also be used for one or more coats.

The anode may be impregnated and then placed in an oven, or the oven may be equipped with an impregnation bath so that both impregnation and pyrolysis may occur within the oven. Ovens which may be employed for the practice of this invention are well known and have inlets for steam and oxidizing agent and vents to permit escape of water vapor and reaction gases. Typically the vents are constructed so that there is a small pressure buildup within the oven, a few mm of Hg or less.

The oven temperature for the pyrolysis reaction is again within the skill of the art and usually between 200° C. to 400° C., preferably between 220° C. and 280° C. The temperature is maintained until pyrolysis, the conversion from manganese nitrate to manganese dioxide, is complete. The amount of time necessary for pyrolysis will vary depending on the oven temperature, heat transfer rates and atmosphere conditions, but typically the amount of time is several minutes, e.g., 2 to 60 minutes.

Steam is injected to provide an atmosphere which has empirically been found to provide manganese dioxide coatings which are smoother and denser than when air alone is employed and to facilitate the use of lower pyrolysis temperature. A theoretical treatment of the action of steam during manganese nitrate pyrolysis is given by T. J. W. DeBruijn, W. A. DeJong, and P. J. Van Der Berg in their paper entitled: "Thermal Decomposition of Aqueous Manganese Nitrate Solutions and Anhydrous Manganese Nitrate. Part 1. Mechanism," published in *Thermochimica Acta*, Vol. 45, Pages 265–278 (1981).

Any means within the skill of the art to inject the steam may be used. For example, the steam may be injected through a manifold in the bottom of the oven. Several steam injection sources may be used. Preferably the steam is superheated to the oven temperature before injection.

The steam injection rate is dependent upon the size and construction of the oven, but generally the minimum rate of steam injection required for optimum performance is that rate which results in an oven atmosphere comprising at least about 90% steam by volume (or about 90% steam and oxidizing agents more active than nitrogen dioxide in the case of the present invention) with less than about 10 vol. % residual or entrained air, as is well known within the skill of the art. For example, in a 25 liter, well-sealed lateral flow oven, a suitable steam injection rate includes 4 grams/minute, and in a 600 liter doorless production-scale oven, a suitable injection rate includes 530 grams/minute.

At least one oxidizing agent more oxidizing than nitrogen dioxide is also introduced into the oven by any suitable means within the skill of the art. The choice of a suitable oxidizing agent which is more oxidizing than nitrogen dioxide is within the skill of the art. Such oxidizing agents include nitric acid, hydrogen peroxide, ozone, and mixtures thereof.

To more fully describe what is meant by more oxidizing than nitrogen dioxide, the standard reduction potentials are given below for nitrogen dioxide and the preferred oxidizing agents of the present invention:

| Standard Reduction Potentials, 25° C., aqueous solution | |
| --- | --- |
| Nitrogen Dioxide | −.43 volts |
| Nitric Acid | −1.24 volts |
| Hydrogen Peroxide | −1.77 volts |
| Ozone | −.2.07 volts |

The larger the negative number, the more oxidizing the agent.

The oxidizing agents provides at least 5% by volume, preferably about 30–50% by volume, of the atmosphere with water vapor (steam) and inert gas providing the remainder of the atmosphere.

Nitric acid is preferably used in strengths of about 20 to 100%, and preferably about 70%. Hydrogen peroxide is preferably used in strengths of about 10 to 35%, and preferably about 30%. It should be noted that 68–70% nitric acid and 30–35% hydrogen peroxide are readily available and relatively inexpensive items of commerce and readily lend themselves to use for the purposes of this invention. In one embodiment of the present invention, both nitric acid and hydrogen peroxide are injected, into the oven.

Ozone may be generated by any suitable source. A typical ozone generator will produce 2–4% ozone by weight of oxygen passed through the generator. Other ozone generators can produce up to 15% ozone by weight of oxygen passed through the generator. The gas produced by an ozone generator and injected into the oven contains a mixture of ozone and oxygen. At least 1% by volume ozone should be present in the atmosphere of the oven and preferably more than 2% by volume.

The amount of ozone can be adjusted by varying the ratio of steam to the mixture of ozone and oxygen. For example, if the ozone and oxygen mixture contains 4% by volume ozone, an oven atmosphere of 50% by volume steam and 50% by volume of the mixture will have an atmosphere containing 2% by volume ozone. It is desirable to have as much ozone as possible in the oven atmosphere up to the point where the ozone becomes explosive (around 30% by volume.)

The injection rate of the oxidizing agent will depend on the steam injection rate of the oven, but the rate should be sufficient to obtain the desired concentration of oxidizing agent in the oven. For example, a suitable injection rate of 70% nitric acid into a 25 liter oven having a steam injection rate of 4 grams per minute includes 2 ml/minute, nitric acid per minute and for a 600 liter oven having a steam injection rate of 530 ml per minute, a suitable 70% nitric acid injection rate includes 200–250 ml per minute. The ratio of oxidizing agent to steam injected is adjusted to obtain the optimal conversion of manganese nitrate to manganese dioxide. A sufficient amount of steam and oxidizing agent is injected to convert the manganese nitrate to manganese dioxide, and is preferably at least about 90% by volume of the oven atmosphere.

While some ESR improvement may be observed through the use of the present invention in connection with as few as one manganese dioxide coat, increasingly better ESR performance is observed as the present invention is applied to an increasing number of applied manganese dioxide coats. The present invention shows the largest amount of ESR improvement when used in connection with manganese dioxide coats produced from manganese nitrate solutions containing more than 25% by weight manganese nitrate.

After the anodes are subjected to the manganese dioxide coating treatment, they are typically coated with graphite and silver conductive paint after a reformation step. This step is conventional. The anodes are then ready for further mounting and molding procedures used to produce the finished devices.

The invention will be further described by reference to the following examples. These examples should not be construed in any way as limiting the invention.

EXAMPLES

A small circulating atmosphere oven was constructed sufficiently large to accommodate one process rack or "lid" of tantalum anodes. The process rack was approx. 9"×12" and slotted along both sides to hold process bars having a number of anodes welded thereto, as is standard practice in the industry. The oven was fitted with a live steam injection line and a glass viewing port to easily observe the pyrolysis process. The direction of atmospheric flow within the oven was from one side to the other laterally. The oven volume was approximately 25 liters.

Testing was conducted with anodes pressed from Starck NA-50K tantalum powder, sintered, and anodized in a anodizing bath with approximately 60 volts to yield anodes having 10 microfarad capacitance and normally rated for 16 volt applications.

Comparative Example 1

Manganese nitrate coated solid tantalum capacitors were produced by subjecting a number of solid tantalum capacitor anodes to a series of manganese nitrate dips and pyrolysis cycles in the pyrolysis oven described above at 260°±20° C. with superheated steam. The anodes were given a reformation step and were coated with graphite and silver containing conductive paint as is industry practice. 100 khz ESR measurements were then taken to eliminate experimental noise from lead frame mounting and molding procedures used to produce finished devices. Referring to FIG. 1, it was observed that anodes which were "upwind" in the circulating oven atmosphere were found to exhibit higher ESR than anodes further "downwind".

Comparative Example 2

Figure 2:
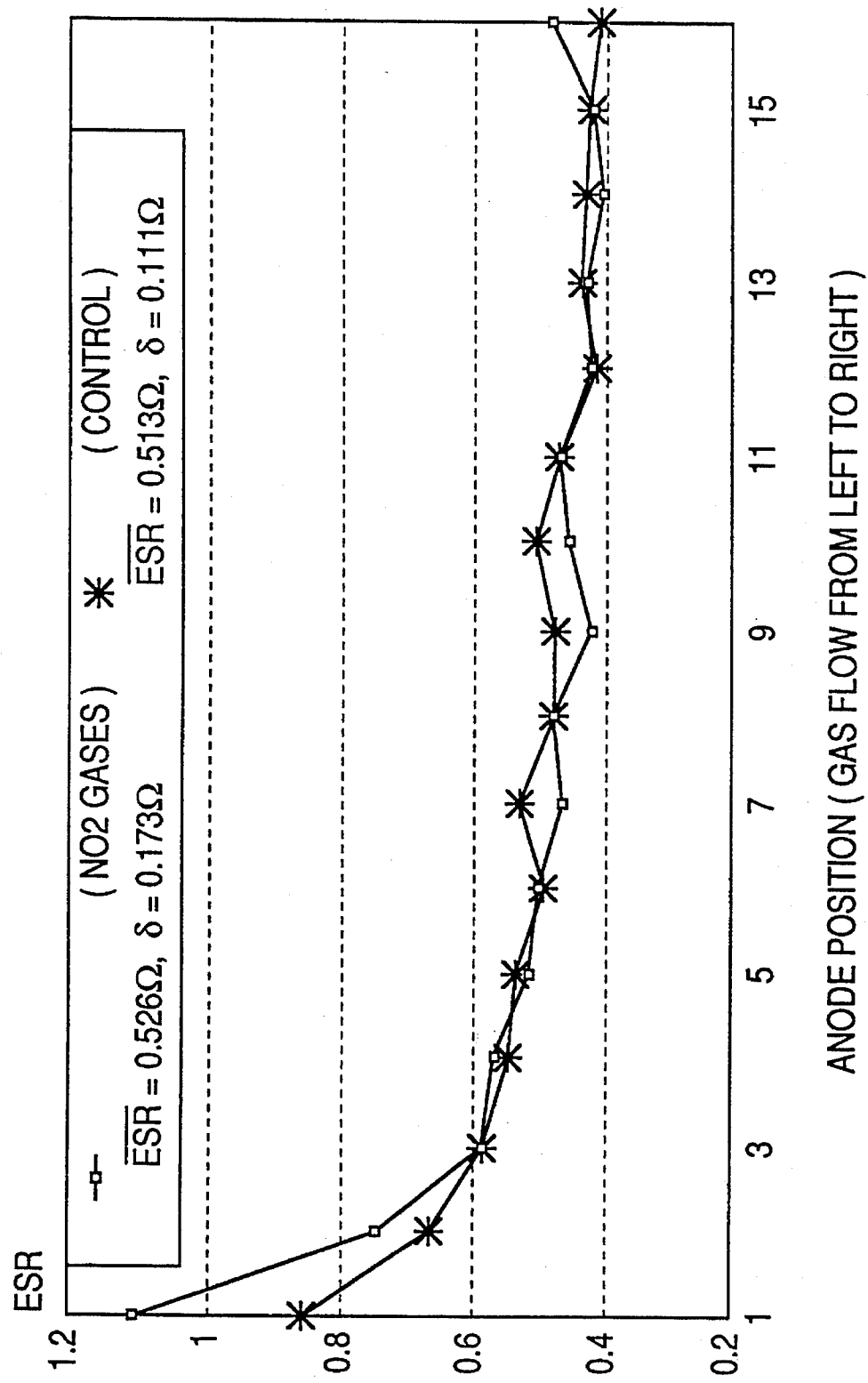
FIG. 2 illustrates an ESR profile in a lateral flow oven with nitrogen dioxide injection.

A second test was run with the same anodes and manganese nitrate impregnation regime described in comparative example 1 except that the oven was filled with nitrogen dioxide by pyrolyzing large anodes containing manganese nitrate immediately prior to pyrolyzing the test anodes. The anodes were processed through silver paint application as before and 100 khz ESR measurements were taken. As shown by FIG. 2, no significant difference were observed in either the ESR profile or average with additional nitrogen dioxide present during the pyrolysis process when compared to the results of comparative example 1.

Example 1

Figure 3:
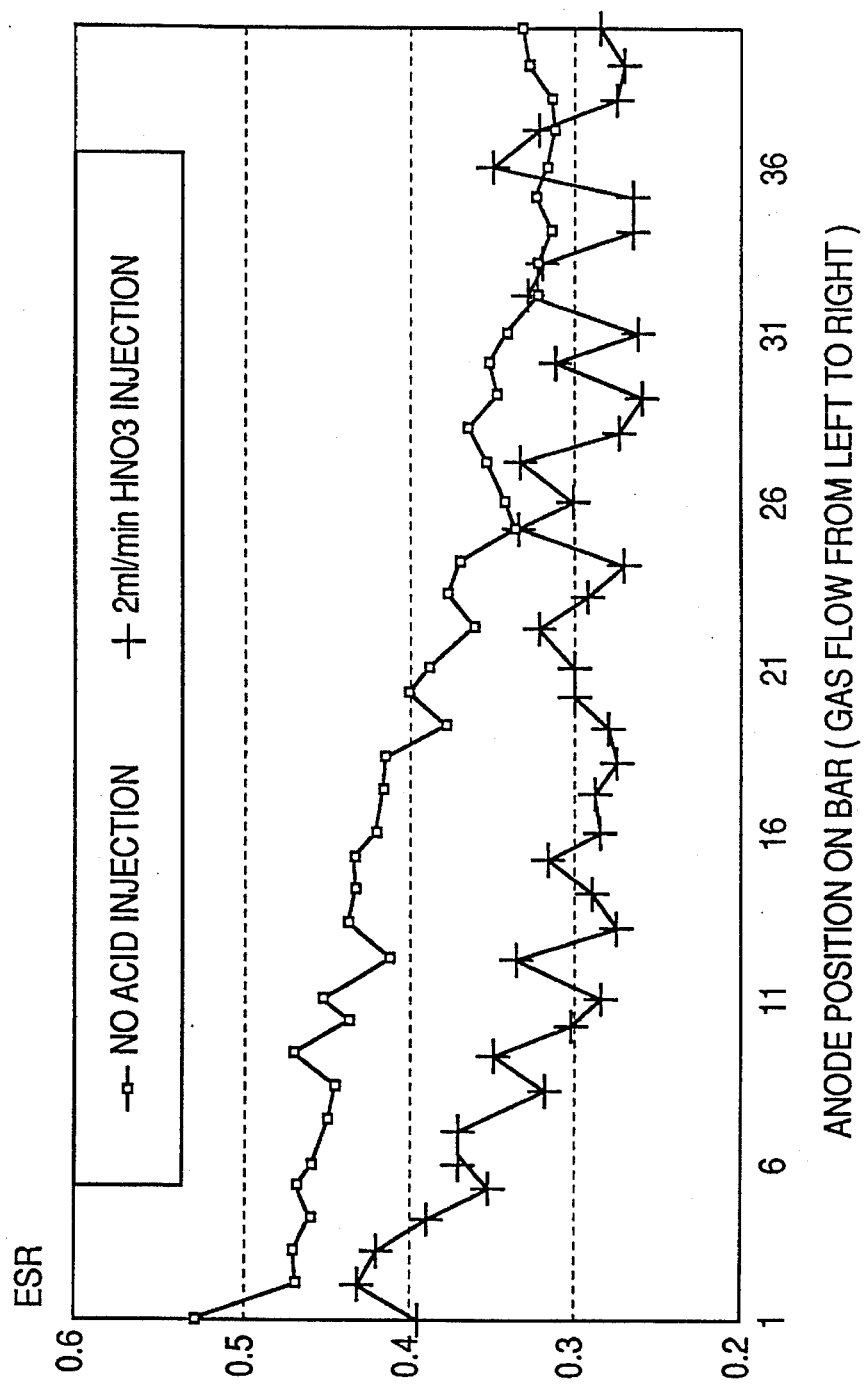
FIG. 3 illustrates an ESR profile in a lateral flow oven with nitric acid injection.

A group of tantalum anodes, rated 10 microfarads and 16 volts and fabricated from Starck NA-50K tantalum powder, was anodized and then pyrolyzed to produce a coating of manganese dioxide. The pyrolysis took place in the 25 liter, lateral-flow oven described above at a temperature of 260° C.±20° C. and with a steam injection rate of 4 gram/minute. A second group of the same anodes was anodized and processed through the same oven with the same temperature and steam injection rate except that 2 ml/minute of 70% nitric acid was also injected into the oven chamber. The anodes of both groups were given a reformation in a dilute acid electrolyte, a practice well-known to those skilled in the art. The anodes were then coated with graphite and silver containing conductive paint. 100 khz ESR measurements were taken of the two groups and the results are depicted in FIG. 3. The group of anodes processed with nitric acid in the oven atmosphere exhibited a reduction in ESR in excess of 20% compared to the group processed without nitric acid. The average ESR was reduced from 0.388 ohm to 0.309 ohm using nitric acid.

Example 2

In order to demonstrate the adaptability of the process of the present invention to production-scale equipment, two additional groups of the anodized anodes used in Example 1 were processed through a production pyrolysis oven having an internal volume of approx. 600 liters. The steam input rate into this oven was 70 lbs/hour or approximately 530 grams/minute. The oven temperature was 250°±10° C.

The higher specific gravity manganese nitrate (i.e., concentrations above 25%) applications on both groups were pyrolyzed in this production oven.

One group of anodes was pyrolyzed using standard conditions and one group was pyrolyzed with nitric acid injected into the oven chamber at a rate of 200–250 ml/minute in order to approximately match the ratio of nitric acid/steam used in Example 1.

The group of anodes pyrolyzed under standard pyrolysis had an average 100 khz ESR for 480 pieces of 0.579 ohm. The group of anodes pyrolyzed with nitric acid injection had an average 100 khz ESR for 480 pieces of 0.361 ohm. Nitric acid injection during pyrolysis resulted in a reduction of device ESR in excess of 35% in this oven.

The oven used for this example was approximately 24 times as large as that used in Example 1. The steam injection rate in terms of grams per minute/oven volume was approximately 5.3 times larger than the oven used in Example 1. Although the basic steam and acid injection rates in terms of grams/minutes were over 100 times higher in this example than in Example 1, by holding the ratio of acid/steam approximately the same as in Example 1, a similar ESR improvement is observed.

The process of the present invention is clearly scalable; in fact, very few production processes are so readily scalable.

Example 3

This example demonstrates the effect of hydrogen peroxide on finished device ESR when introduced, in combination with nitric acid, in the oven chamber during pyrolysis. A group of 10 microfarad/16 volt rated anodes of the same design as used in Example 2 were anodized and then coated with manganese dioxide using the 25 liter, lateral-flow oven described above. The flow rate of 70% nitric acid was 2 ml/minute and the flow rate of 30% hydrogen peroxide was 4 ml/minute into the oven during pyrolysis of the higher specific gravity manganese nitrate applications. The oven temperature was 260°±20° C. and the steam injection rate was 7 grams/minute.

Figure 4:
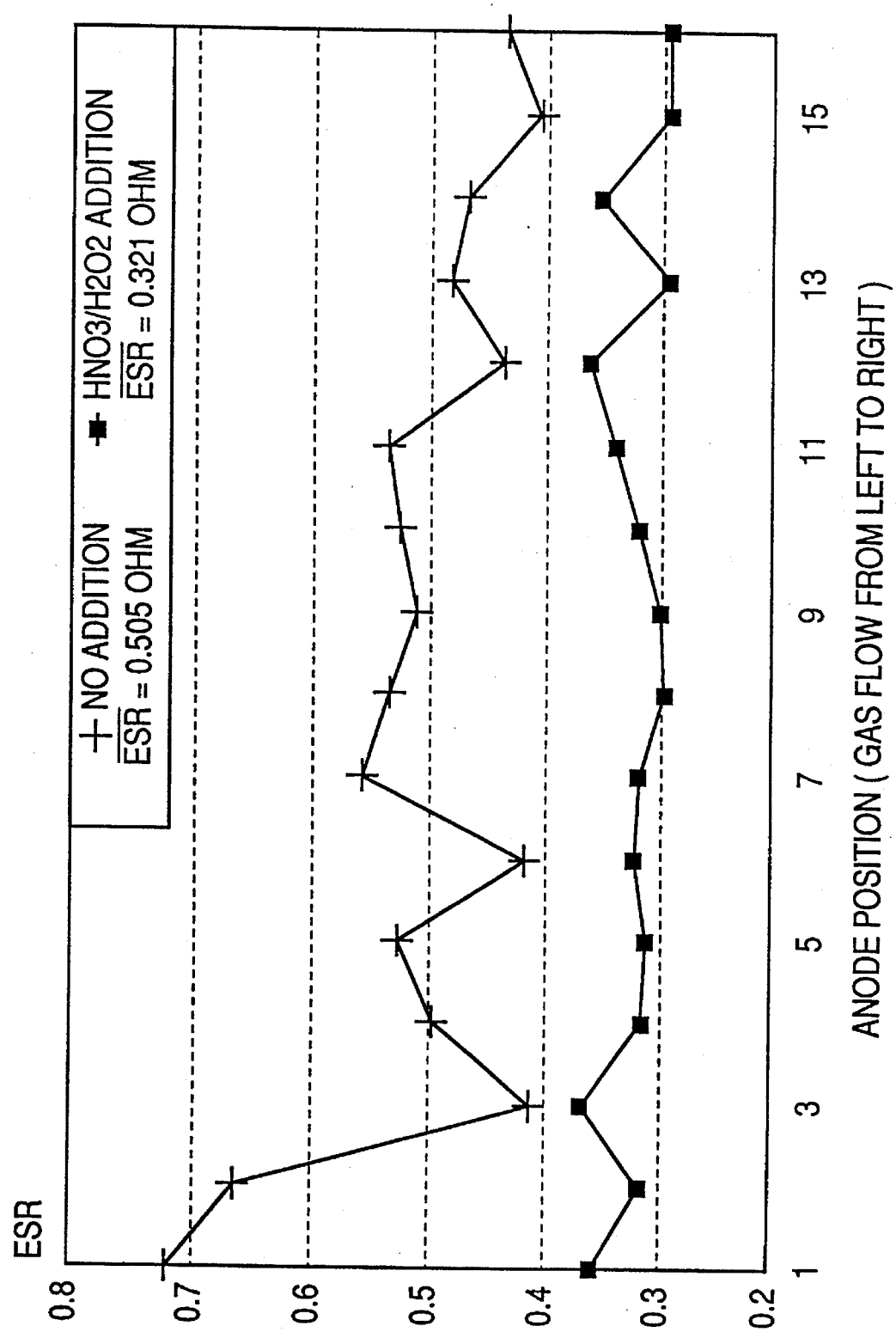
FIG. 4 illustrates an ESR profile in a lateral flow oven with nitric acid and hydrogen peroxide injection.

The 100 khz ESR measurements for this group is shown in FIG. 4, and the reduction of the ESR profile is readily apparent. The average ESR of the nitric acid/hydrogen peroxide treated anodes was 0.321 ohm which is over 35% less than the 0.505 ohm value obtained with anodes not treated with acid injection.

Example 4

In order to illustrate the effect of ozone upon the pyrolytic production of manganese dioxide coatings on tantalum capacitors, two groups of anodized anodes of the same design as used in Example 1 were coated with pyrolytic manganese dioxide using the 25 liter, lateral-flow oven described above. Oven temperature was 260°±20° C. and the steam injection rate was 4 grams/minute.

An electric ozone generator was attached to the pyrolysis oven to inject ozone into the oven chamber. According to manufacturing specifications, the ozone generator produces 2–4% ozone by weight of oxygen passed through the generator using a high voltage corona discharge.

Approximately 2.9 liters/minute of oxygen was passed through the generator and injected into the pyrolysis oven chamber during the pyrolysis of the higher specific gravity manganese nitrate applications. One group was processed with ozone created from the corona discharge. The corona discharge was not turned on for the other group.

Figure 5:
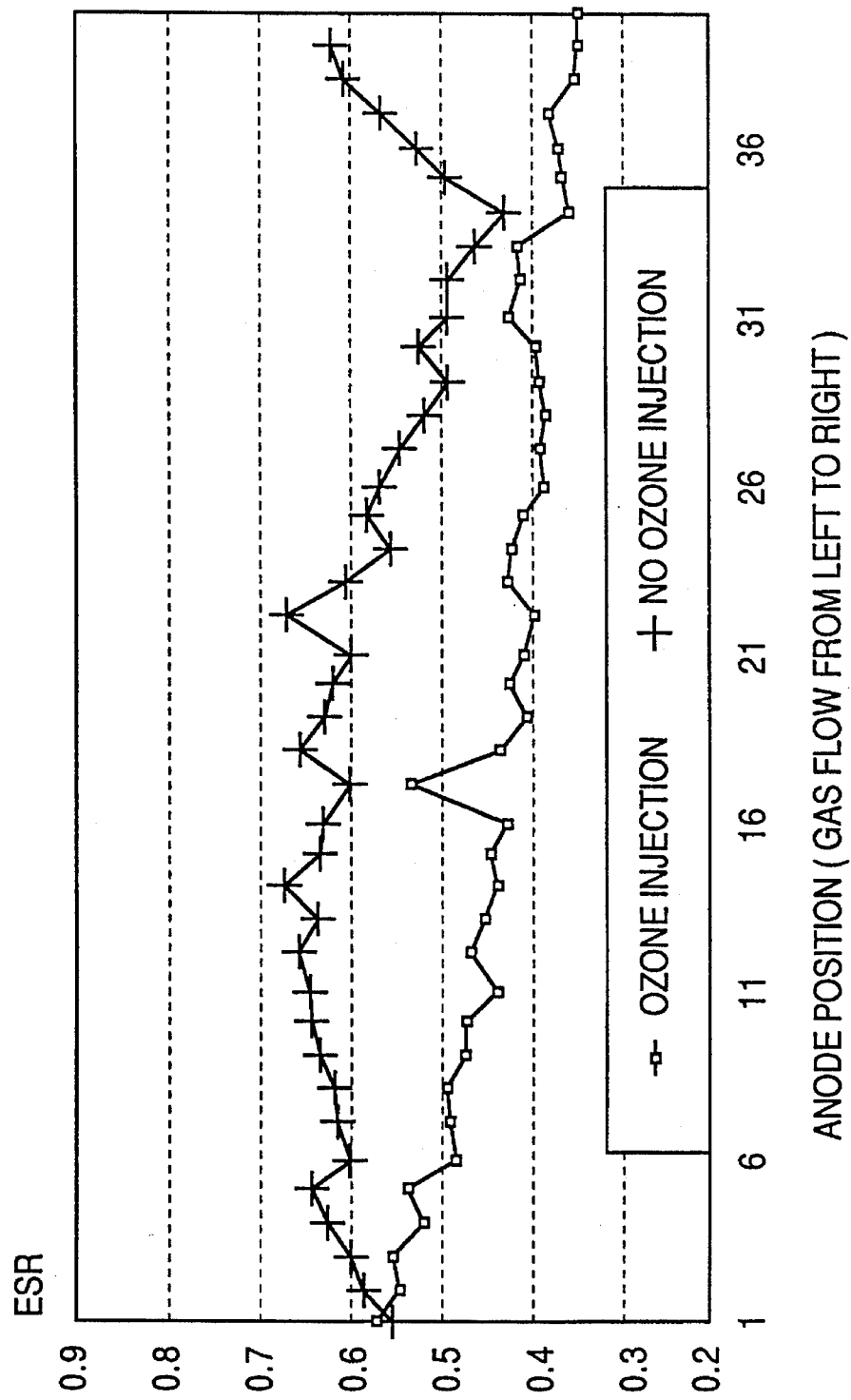
FIG. 5 illustrates an ESR profile in a lateral flow oven with ozone injection.

The 100 khz ESR results for the graphite and silver paint coated devices from both groups is graphically depicted in FIG. 5. The presence of ozone in the pyrolysis oven resulted in an ESR value of 0.433 ohm which is over 25% less than the 0.583 ohm value obtained for the group not processed with ozone. An even greater reduction in ESR might be achieved through the use of ozone injection during pyrolysis with a specially constructed, chilled-electrode generator capable of converting a significantly higher percentage of oxygen into ozone.

Example 5

In order to illustrate the wide range of concentrations over which the injection of nitric acid leads to reduction in E.S.R., 3 groups of anodes fabricated from Starck NA-50K tantalum powder (rated 10 microfarads/16 volts) were anodized and coated with manganese dioxide via manganese nitrate application pyrolysis in the 25 liter lateral flow oven. The temperature was 260° C.±20° C.

The first group was processed with 4 ml of steam and 1 ml of 70% nitric acid injection per minute.

The second group was processed with 4 ml of steam and 2 ml of 70% nitric acid injected per minute.

The third group was processed with no steam and 5–6 ml of 70% nitric acid injected per minute.

Figure 6:
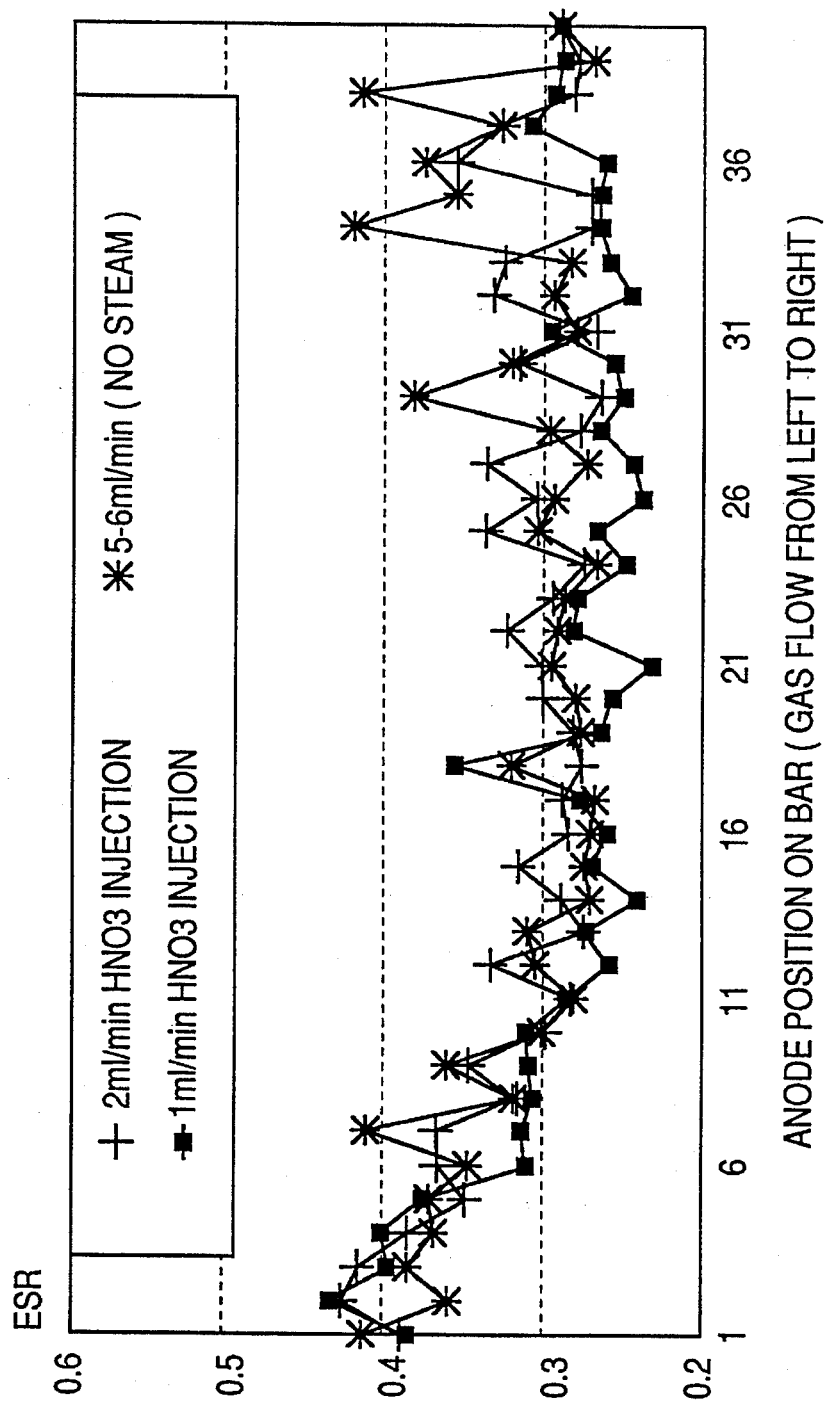
FIG. 6 illustrates an ESR profile in a lateral flow oven with nitric acid injection of varying concentrations.

The 100 khz ESR values of the graphite and silver paint coated anodes are shown in FIG. 6.

| ML Nitric Acid/Min | Average 100 khz ESR |
| --- | --- |
| 1 ml | 0.284 ohm |
| 2 ml | 0.309 ohm |
| 5–6 ml | 0.313 ohm |
| Control (From Example 1) | 0.388 ohm |

The injection of nitric acid results in a substantial reduction in device ESR compared to the control over a very broad range of atmospheric concentrations up to at least 70% nitric acid by weight.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method for forming a coating of manganese dioxide on valve metal capacitor anodes comprising impregnating valve metal capacitor anodes with manganese nitrate; placing the coated anodes in an oven; injecting steam into the oven; injecting a non-halogenated oxidizing agent which is more oxidizing than nitrogen dioxide into the atmosphere of the oven; and heating the oven to a temperature sufficient for pyrolysis of the manganese nitrate to manganese dioxide, wherein the oxidizing agent is selected from the group consisting of nitric acid, ozone, hydrogen peroxide, and mixtures thereof.

2. The method of claim 1 wherein the valve metal is selected from the group consisting of tantalum, niobium, aluminum, titanium, zirconium, alloys thereof, and metallic-based glass compositions thereof.

3. The method of claim 1 wherein the steam is superheated to the oven temperature before injection.

4. The method of claim 1 wherein the anodes are impregnated with a solution containing more than about 25% by weight manganese nitrate.

5. A method for forming a coating of manganese dioxide on tantalum capacitor anodes comprising impregnating tantalum capacitor anodes with manganese nitrate; placing the coated anodes in an oven; injecting steam into the oven; injecting a non-halogenated oxidizing agent which is more oxidizing than nitrogen dioxide into the atmosphere of the oven; and heating the oven to a temperature sufficient for pyrolysis of the manganese nitrate to manganese dioxide, wherein the oxidizing agent is selected from the group consisting of nitric acid, ozone, hydrogen peroxide, and mixtures thereof.

6. The method of claim 5 wherein the tantalum is tantalum metal or an alloy of tantalum.

7. The method of claim 5 wherein the temperature is between about 200° C. and 400° C.

8. The method of claim 6 wherein the oxidizing agent comprises at least 5% by volume of the oven atmosphere.

9. The method of claim 8 wherein the oxidizing agent comprises about 30–50% by volume of the oven atmosphere.

10. The method of claim 6 wherein the amount of steam and oxidizing agent comprises at least about 90% by volume of the oven atmosphere.

11. The method of claim 6 wherein the oxidizing agent comprises nitric acid.

12. The method of claim 6 wherein the oxidizing agent comprises a mixture of nitric acid and hydrogen peroxide.

13. The method of claim 5 wherein the oxidizing agent comprises ozone.

14. The method of claim 13 wherein the oxidizing agent comprises a mixture of ozone and oxygen and produces at least 1% by volume ozone in the oven atmosphere.

15. The method of claim 14 wherein the mixture of ozone and oxygen produces at least 2% by volume ozone in the oven atmosphere.

16. The method of claim 5 wherein the steam is superheated to the oven temperature before injection.

17. The method of claim 5 wherein the anodes are impregnated with a solution containing more than about 25% by weight manganese nitrate.

18. The method of claim 5 wherein the anodes are impregnated with a suspension of manganese dioxide powder in a manganese nitrate solution.

19. In a method of forming a solid tantalum capacitor including sintering and anodizing a porous tantalum anode; impregnating the anode with manganese nitrate, and heating the anode in an oven while injecting steam into the atmosphere of the oven, the improvement comprising injecting into the oven a non-halogenated oxidizing agent which is more oxidizing than nitrogen dioxide, wherein the oxidizing agent is selected from the group consisting of nitric acid, ozone, hydrogen peroxide, and mixtures thereof.

* * * * *